Dec. 5, 1950          F. W. SCHWINN          2,532,574
SADDLE MOUNTING
Filed Sept. 13, 1944          2 Sheets-Sheet 1
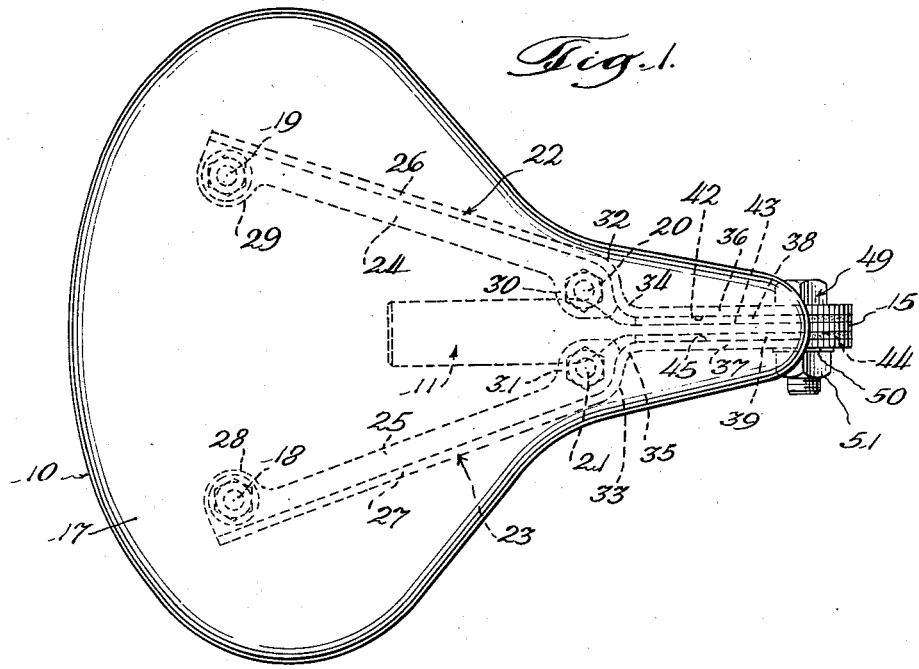
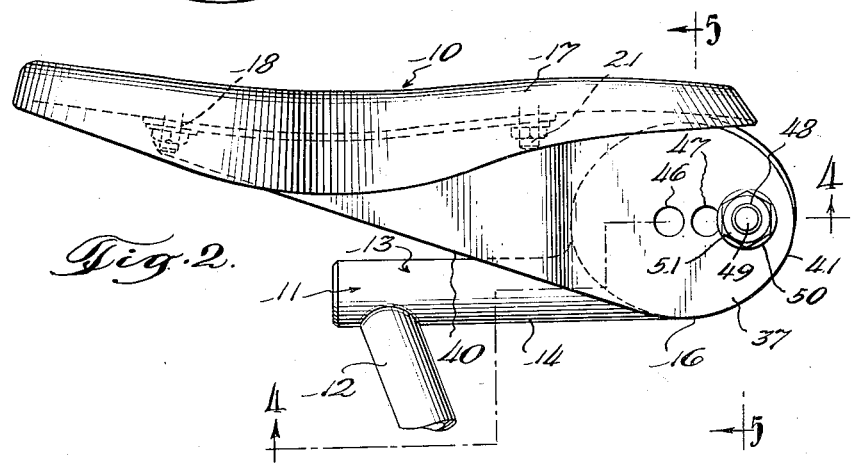
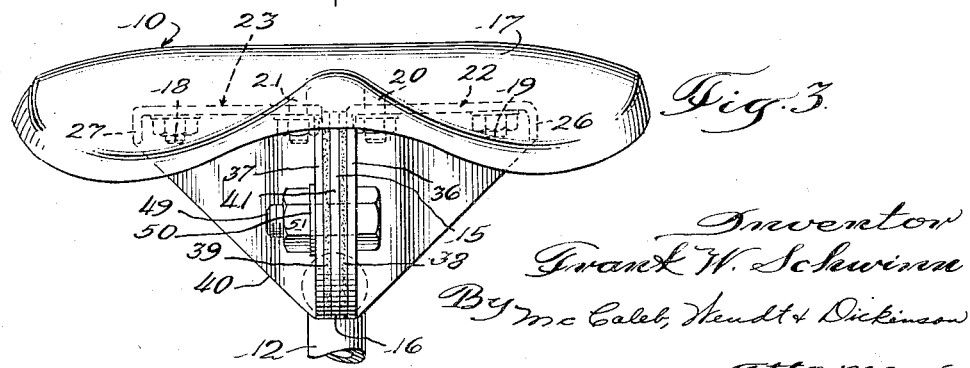
Inventor
Frank W. Schwinn
By McCaleb, Hendt & Dickinson
attorneys Dec. 5, 1950  F. W. SCHWINN  2,532,574
SADDLE MOUNTING
Filed Sept. 13, 1944  2 Sheets-Sheet 2
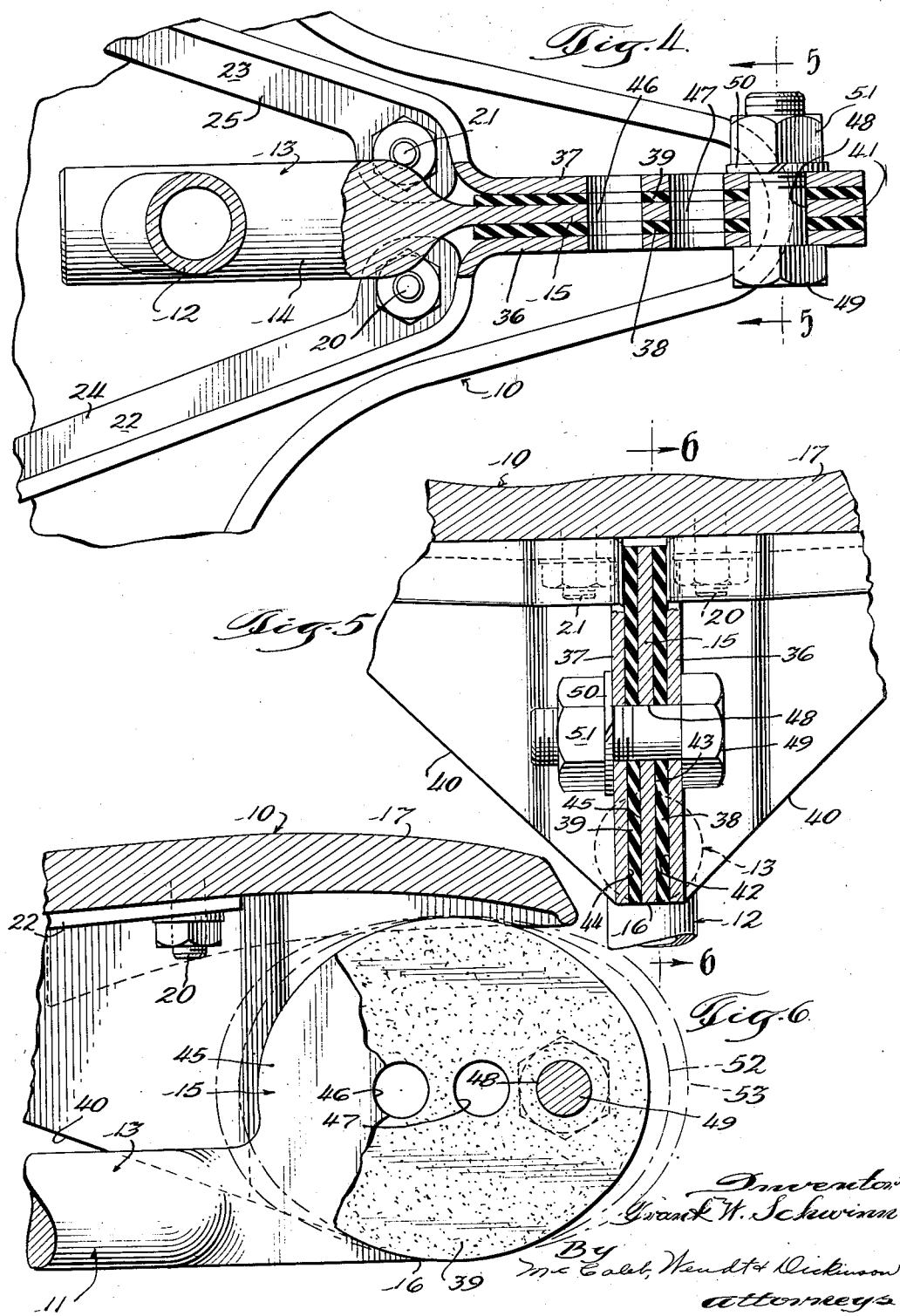

Patented Dec. 5, 1950

2,532,574

UNITED STATES PATENT OFFICE 2,532,574

SADDLE MOUNTING

Frank W. Schwinn, Chicago, Ill.

Application September 13, 1944, Serial No. 553,844

4 Claims. (Cl. 155—5.17)

The present invention relates to saddle mountings and is particularly concerned with saddle mountings for bicycles or the like.

One of the objects of the invention is the provision of an improved saddle mounting for bicycle saddles by means of which the rider may be insulated from the shocks and vibration incident to the riding of bicycles upon relatively rough terrain.

Another object of the invention is the provision of an improved bicycle saddle mounting in which the saddle is resiliently mounted by means of a simplified structure which is adapted to minimize or eliminate metal-to-metal contact between the parts of the saddle which carry the rider and the frame of the bicycle so as to reduce substantially the vibration and shocks transmitted to the rider from the frame.

Another object of the invention is the provision of an improved bicycle saddle mounting of the class described which may be adjusted very quickly and with a minimum amount of labor to vary the stiffness or resiliency of the saddle in its shock-absorbing action to suit the individual needs of various riders.

Another object of the invention is the provision of an improved bicycle saddle mounting of the class described the structure of which may be predetermined for riders of different weight, such as especially heavy persons, normal adults of average weight, women or children.

Still another object of the invention is the provision of an improved saddle structure of the class described which is simple, which includes a minimum number of parts, which is durable, which is easily adjustable and which may be constructed at a very low cost so that it may be placed within the price range that will make it available to a vast number of users.

Other objects and advantages of the invention will be apparent from the following description and the accompanying drawings, in which similar characters of reference indicate similar parts throughout the several views.

Referring to the drawings, of which there are two sheets:

Figure 1 is a top plan view of a bicycle saddle embodying the invention;

Fig. 2 is a side elevational view of the saddle shown in connection with the seat post mast;

Fig. 3 is a front elevational view;

Fig. 4 is a fragmentary sectional view taken on the plane of the line 4—4 of Fig. 2 looking in the direction of the arrows;

Fig. 5 is a fragmentary sectional view taken on the plane of the line 5—5 of Fig. 4 looking in the direction of the arrows; and Fig. 6 is a fragmentary sectional view taken on the plane of the line 6—6 of Fig. 5 looking in the direction of the arrows.

The saddles embodying the invention may be utilized with any type of seat post mast including that type which includes a clamp on top of the seat post and a separate horizontal mast member permitting forward and rearward adjustment of the saddle. For simplicity the saddle 10 is shown in connection with a seat post mast 11 in which the seat post 12 and mast member 13 are integral. I desire it to be understood that when the saddle is to be used with an adjustable seat post mast, the post 12 will be provided with a suitable clamp.

The mast 13 preferably comprises a steel member having a substantially cylindrical body 14 which may be solid or tubular but which is preferably solid adjacent its juncture with a forwardly extending relatively flat flange or plate 15 which is integrally joined to the cylindrical portion 14. The flange 15 is preferably oval in shape as for example substantially elliptical, and it is preferably located with its lower edge 16 extending tangentially to the lower edge of the mast 13 so that the major portion of the oval flange 15 projects above the mast 13.

The saddle 17 may consist of a member of any desired construction such as for example a cover member of suitable leather of the shape shown in Fig. 1 which may be provided with a suitable sponge rubber padding to give it thickness, or the saddle may consist of a molded sponge rubber member provided with suitable reenforcing and covered with an outer layer of smooth rubber. In addition to ordinary rubber, I may use synthetic compounds having similar characteristics.

The saddle 17 preferably has a plurality of short bolts 18—21 extending downwardly from its lower surface, the bolts having their heads embedded in the body of the saddle 17 and securely attached to suitable reenforcing means such as, for example, fiber plates embedded in the sponge rubber. Two of the bolts 19 and 18 are preferably symmetrically located practically centrally of the left and right seat supporting portions of the saddle at the rear while the two bolts 20 and 21 are preferably located forwardly of the saddle practically at the juncture of the nose of the saddle and the major supporting area of the saddle.

The saddle is supported by a pair of diagonally extending frame members 22, 23 each of which is preferably provided with an attaching flange portion 24, 25 and with a transversely, that is, vertically extending reenforcing flange portion 26, 27. The attaching flange portions 24 and 25 may have partially circular enlargements 28, 29 provided with apertures for receiving the bolts 18 and 19 and similar partially circular enlargements 30, 31 provided with apertures for receiving the bolts 20, 21 to which they may be secured by the use of suitable nuts and washers.

The frame members 22 and 23 preferably extend diagonally forward and toward each other under the major supporting area of the saddle 17 and at the points 32, 33 the reenforcing flanges 26 and 27 bend inwardly at an obtuse angle and are bent outwardly again at 34, 35 at substantially right angles to locate the plates 36, 37 at the forward end of the frame members 22 and 23 parallel to each other and spaced from each other sufficiently to provide room for the layers of rubber 38, 39 and the oval flange 15 which is carried by the seat post mast. The width of the reenforcing flange 26, 27 may vary, increasing gradually from the back ends of the frame members 22, 23 toward the forward end so that the lower boundaries 40 of these flanges may be tangential to the substantially oval plate formations 36 and 37. The forward edges 41 of these plates 36, 37, 15 and of the rubber portions 38, 39 may have the same oval shape so that these parts are all flush with each other at the forward edges.

The rubber layers 38 and 39 may consist of resilient flexible live rubber sheets or of synthetic material having the same characteristics, the external surfaces of these sheets being bonded by means of cement or vulcanizing to the adjacent surfaces of the adjacent plates. Thus, for example, the rubber sheet 38 is bonded to the inner surface 42 of the plate 36 and to the outer surface 43 of the plate 15. Also the rubber sheet 39 is bonded to the outer surface 44 of the plate 15 and to the inner surface 45 of the plate 37.

All of the plates and sheets 36, 38, 15, 39 and 37 are preferably provided with a plurality of registering apertures or through-bores 46, 47, 48, the innermost of which 46 is located substantially centrally of the oval plate 15 and the other two of which are located forwardly of the aperture 46 along the largest diameter of the oval plate 15 and preferably equally spaced from each other.

Screw bolt 49 passes through one of the apertures such as, for example, the aperture 48 and is provided with a washer 50 and nut 51 by means of which the plates 36 and 37 are clamped against the rubber layers 38 and 39 which engage the central oval plate 15.

The bolt 49 provides the actual physical point of pivot of the parts and is the means of varying the resiliency of the assembly to meet the individual needs of the rider. For example, if the bolt 49 is located in aperture 48, the assembly will have its most stiff characteristic as the intermediate rubber portions 38, 39 which tend to resist rotative movement of the plates 36, 37 relative to the plate 15 have portions rearwardly of these plates which are located at the greatest distance from the point of pivot comprising the axis of bolt 49. When the bolt is placed in the aperture 47, the saddle mounting will be still more flexible and resilient, that is, it will flex responsive to lighter loads and it will move farther in response to a shock of the same magnitude.

The greatest flexibility will of course be secured when the bolt is located in the centrally located aperture 46 where the pivotal movement between the plates carried by the saddle and the plate carried by the seat post mast will be resisted by the shear strength of rubber located at a minimum distance from the center of pivot.

The aperture extending through the central plate 15 may, if desired, be enlarged so that actual metal-to-metal contact between the bolt 49 and the seat post mast plate is eliminated and the rider is thus insulated from the metallic transmission of shocks from the frame to the saddle.

Referring to Fig. 6, the dotted line outlines 52 and 53 show alternative shapes for the oval plate assembly by means of which the relative stiffness of the mounting may be varied for persons of different weights such as children, women and adults. The length of the oval may be increased for heavier riders, thus increasing the moment arm at which the shearing force of reaction in the rubber tends to act to return these parts to normal position when the saddle is carrying a rider.

It will thus be observed that I have invented an improved saddle structure and saddle mounting which is simple, sturdy and which includes a minimum number of parts and which is adapted to absorb the shocks of riding on relatively rough terrain by means of the shearing action of solid resilient live rubber.

The resilient characteristics of my saddle mounting may be varied by changing the point of physical pivot between the movable parts of the seat post mast and the saddle frame and the structure may also be varied to accommodate the saddle to very light individuals such as children or women, or for men or very heavy adults.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a saddle mounting for bicycles, the combination of a saddle structure having a pair of rigid frame members secured to the lower surface thereof and extending forwardly from the rear of the saddle toward the nose thereof, said frame members being provided with a pair of relatively large flat end portions disposed with their flat surfaces extending longitudinally of the saddle nose and substantially perpendicular to the general plane of the saddle structure, said end portions having a plurality of longitudinally displaced and aligned apertures therein, a seat post mast having a forwardly extending and flat enlarged end portion of substantially the same size and shape as and disposed between the end portions of the frame members, said end portions of the frame members and seat post mast being spaced apart and connected together through layers of live resilient material bonded to the adjacent flat surfaces thereof so that a load on the saddle structure effects shearing stress in the resilient material, said enlarged end portion of the seat post mast and said resilient material having apertures therein registering with the apertures in the end portions of the frame members, and a clamping element extending through a selected set of said registering apertures for clamping all of said end portions together and providing a fulcrum for relative movement of the enlarged end portion of the seat post mast and the end portions of the frame members, the apertures selected determining the center of said shearing stress and thereby adapting the resiliency of the assembly to the need of the user.

2. In a saddle mounting for bicycles, the combination of a saddle structure provided with a plurality of depending securing members and a pair of rigid metal frame members connected to said securing members and extending forwardly from the rear of said saddle toward the nose thereof, said frame members being provided with a pair of relatively large flat enlargements having three separated apertures therein in aligned relationship, a seat post mast having a forwardly extending flat enlargement of substantially the same size and shape as and disposed between the enlargements of said frame members, said enlargements of the frame members and seat post mast being spaced from each other by layers of live resilient material engaging the faces of said enlargements in such manner as to cause a shearing action in said resilient material when a load is placed upon the saddle and resisted through said resilient material, said enlargement of the seat post mast and said layers of resilient material having spaced apertures therein registering with the apertures in the enlargements of the frame members, and a clamping element extending through a selected set of said registering apertures to serve as a fulcrum for relative movements of the frame members and seat post mast and for clamping all of said enlargements together, said clamping element being movable to other of the apertures to vary the resiliency of the assembly to meet the need of the user, said frame members being provided with attaching flanges and with reenforcing flanges, these flanges extending transversely to each other, and said reenforcing flanges tapering backwardly from said enlargements to the rear ends of the frame members.

3. In a saddle mounting for bicycles, the combination of a saddle structure provided with a plurality of depending securing members and a pair of rigid metal frame members connected to said securing members and extending forwardly from the rear of said saddle toward the nose thereof, said frame members being provided with a pair of relatively large flat enlargements having three separated apertures therein in aligned relationship, a seat post mast having a forwardly extending flat enlargement of substantially the same size and shape as and disposed between the enlargements of said frame members, said enlargements of the frame members and seat post mast being spaced from each other by layers of live resilient material engaging the faces of said enlargements in such manner as to cause a shearing action in said resilient material when a load is placed upon the saddle and resisted through said resilient material, said enlargement of the seat post mast and said layers of resilient material having spaced apertures therein registering with the apertures in the enlargements of the frame members, and a clamping element extending through a selected set of said registering apertures to serve as a fulcrum for movements of the enlargement of the seat post mast relative to the enlargements of the frame members and for clamping all of said enlargements together, said clamping element being movable to other of the apertures to vary the resiliency of the assembly to meet the need of the user, said frame members being provided with attaching flanges and with reenforcing flanges, these flanges extending transversely to each other, said reenforcing flanges tapering backwardly from said enlargements to the rear ends of the frame members, and said resilient material being bonded to the surface of each of the adjacent enlargements.

4. In a saddle mounting for bicycles, the combination of a saddle structure provided with a plurality of depending securing members and a pair of rigid metal frame members connected to said securing members and extending forwardly from the rear of said saddle toward the nose thereof, said frame members being provided with a pair of relatively large flat enlargements having three separated apertures therein in aligned relationship, a seat post mast having a forwardly extending flat enlargement of substantially the same size and shape as and disposed between the enlargements of said frame members, said enlargements of the frame members and seat post mast being spaced from each other by layers of live resilient material engaging the faces of said enlargements in such manner as to cause a shearing action in said resilient material when a load is placed upon the saddle and resisted through said resilient material, said enlargement of the seat post mast and said layers of resilient material having spaced apertures therein registering with the apertures in the enlargements of the frame members, and a clamping element extending through a selected set of said registering apertures to serve as a fulcrum for movements of the enlargements of the frame members relative to the enlargement of the seat post mast and for clamping all of said enlargements together, said clamping element being movable to other of the apertures to vary the resiliency of the assembly to meet the need of the user, said frame members being provided with attaching flanges and with reenforcing flanges, these flanges extending transversely to each other, said reenforcing flanges tapering backwardly from said enlargements to the rear ends of the frame members, said resilient material being bonded to the surface of each of the adjacent enlargements, and said clamping element comprising a threaded bolt extending through all of said enlargements and having a nut thereon.

FRANK W. SCHWINN.

REFERENCES CITED

The following references are of record in the file of this patent:

UNITED STATES PATENTS

| Number | Name | Date |
| --- | --- | --- |
| 151,660 | Gibson | June 2, 1874 |
| 1,087,393 | Olds | Feb. 17, 1914 |
| 1,118,600 | Troxel | Nov. 24, 1914 |
| 1,140,724 | Troxel | May 25, 1915 |
| 1,373,718 | Evans | Apr. 5, 1921 |
| 2,193,455 | Hayes | Mar. 12, 1940 |
| 2,201,450 | Nordmark | May 21, 1940 |
| 2,280,298 | Nordmark | Apr. 21, 1942 |
| 2,303,567 | McWhorter et al. | Dec. 1, 1942 |
| 2,476,226 | Schwinn | July 12, 1949 |

FOREIGN PATENTS

| Number | Country | Date |
| --- | --- | --- |
| 51,582 | Germany | Apr. 18, 1890 |
| 276,152 | Great Britain | Aug. 27, 1927 |
| 698,885 | Germany | Nov. 19, 1940 |